United States Patent [19]

Brown et al.

[11] Patent Number: 4,849,161

[45] Date of Patent: Jul. 18, 1989

[54] DEBRIS-RESISTANT FUEL ASSEMBLY

[75] Inventors: Charles A. Brown, Kennewick, Wash.; Rolf Holzer, Erlangen, Fed. Rep. of Germany; John F. Patterson, Richland, Wash.

[73] Assignee: Advanced Nuclear Fuels Corp., Richland, Wash.

[21] Appl. No.: 124,698

[22] Filed: Nov. 24, 1987

Related U.S. Application Data

[63] Continuation-in-part of Ser. No. 16,432, Feb. 19, 1957, Pat. No. 4,729,926.

[51] Int. Cl.$^4$ .............................................. G21C 3/34
[52] U.S. Cl. .................................. 376/439; 376/440; 376/442
[58] Field of Search ............... 376/311, 438, 439, 440, 376/442

[56] References Cited

U.S. PATENT DOCUMENTS

| | | | |
|---|---|---|---|
| 4,309,251 | 1/1982 | Anthony et al. | 376/446 |
| 4,391,771 | 7/1983 | Anthony | 376/451 |
| 4,726,926 | 2/1988 | Patterson | 376/439 |
| 4,756,878 | 7/1988 | King | 376/439 |
| 4,781,884 | 11/1988 | Anthony | 376/352 |

Primary Examiner—Donald P. Walsh
Attorney, Agent, or Firm—Volker R. Ulbrich; Robert K. Sharp

[57] ABSTRACT

A fuel assembly for nuclear reactors which comprises the usual upper and lower tie plates and fuel rods extending between them is made debris-resistant by providing a grid spacer in contact, or very nearly so, with the lower tie plate and so positioned as to subdivide the usual openings in the lower tie plate which are provided for the passage of cooling water. This causes debris to be trapped in the openings of the lower tie plate, and keeps it from contacting the fueled portion of the assembly.

10 Claims, 3 Drawing Sheets

DEBRIS-RESISTANT FUEL ASSEMBLY

This is a continuation in part of Ser. No. 16,432, filed Feb. 19, 1987, now U.S. Pat. No. 4,726,926, granted Feb. 23, 1988.

This invention is directed to a debris-resistant nuclear fuel assembly particularly for pressurized water reactors.

BACKGROUND

In pressurized water reactors, the nuclear fuel is in the form of rods, which are held by grid spacers containing springs which press the rods against other springs or against dimples. A plurality of these grid spacers is positioned along the length of the rods, which may be ten or twelve feet. The rods extend between, but ordinarily do not penetrate, upper and lower tie plates. These plates and the grid spacers are attached to tie rods which usually also serve as guide tubes for the control rods which vary the reactivity of the assembly. The tie rods are often secured to the tie plates by quick release mechanisms which permit disassembly of the fuel assembly. The grid spacers are positioned at intervals along the length of the rods, with the lowest usually being several inches above the lower tie plate. The fuel rods expand several inches in length during their irradiation and the location of the upper- and lowermost grid spacers must take this into account.

One of the problems in connection with the operation of nuclear reactors is the accumulation of debris of various types, which may occur during the original construction or during repair and may include nuts, bolts, metal turnings, shavings, and various kinds of trash. The upper and lower tie plates are provided with comparatively large openings for the flow of water. The largest debris, which will not pass through these openings, causes no particular trouble. The smallest, which may be, for example, of the size of ordinary sand grains, passes through the assembly, again without causing any particular difficulty. The intermediate size debris, however, can be extremely troublesome since it may be caught between the fuel rods, and abrade them. This can cause escape of fuel and fission products into the cooling water, creating radiation problems. The tendency to lodge between fuel rods is particularly prevalent in the portion of the rods below the lowest grid spacers.

One of the attempts to mitigate the debris problem has been to use very long end caps, which extend from the ends of the fuel rods to the lowermost grid. Thus, the portion of the rod which is most exposed to abrasion by the debris does not contain fuel, and therefore does not give rise to the problem of radiation escaping as described above. However, this has the disadvantage of replacing a portion of the fuel by inert material, and thus reducing the available power of the assembly. Another proposed solution has been the provision of small holes in the lower tie plate which act as a screen and to prevent the debris from contacting the fuel rods. However, this increases the pressure drop through the assembly and can result in a lower coolant flow and, therefore, lowered permissible power level. Moreover, the debris which does not pass through the lower tie plate is held there and, when the circulation of the cooling water is discontinued, drops to the bottom of the reactor vessel where it is available to cause trouble the next time the circulation is started.

BRIEF DESCRIPTION OF THE INVENTION

According to this invention, the design of the assembly is such that it effectively traps the debris so that it does not contact the fuel portion of the fuel rods, and holds it there so that it is removed from the assembly during the refueling operation. It does not materially increase the pressure drop of the assembly and does not require the use of excessively long end caps with their resultant loss of power. The design is such that there is a cross flow of fluid between channels so that all the rods are effectively cooled, even though some spaces are partially blocked by the debris.

In order to accomplish this, a fuel assembly grid spacer, preferably similar to that shown and described in application Ser. No. 16,432, filed Feb. 19, 1987, now U.S. Pat. No. 4,726,926, is positioned on, or at the most only slightly above, the lower tie plate. It is so positioned as to divide the openings of the lower tie plate into smaller openings. The arrangement is such that debris which can pass the openings of the tie plate will encounter the edges of the structural members of the grid spacer and be held there, i.e., within the lower tie plate, or extending slightly into the grid spacer, depending on the size and shape of the piece of debris. The rods penetrate sufficiently into this lowermost grid spacer as to be held in position thereby, but not so far that the fueled portion will encounter the piece of debris. In determining the degree of penetration of the lowermost grid spacer, an allowance for up to two inches of irradiation fuel growth must be made in order to maintain the proper relationship during the life of the assembly. To ensure spring contact over this range, the depth of the end spacer located against the lower tie plate must be increased over that of a normal spacer. When the grid spacer is of the design referred to above, this has the benefit of increasing the fuel rod restraint and rod support surface area. This should decrease the probability of fretting of the fuel rods by the grid spacer.

In order to minimize rod vibration and fretting, it is particularly important to maintain proper spring load on this lowermost grid spacer. It is also desirable from the standpoint of neutron economy to use an all-zircaloy spacer. This also avoids the presence of cobalt (a constituent of Inconel), which becomes intensively radioactive under neutron irradiation. According to another feature of this invention, the spring load on such an all-zircaloy spacer can be further enhanced by orientation of the rolling directions for specific spacer parts. Irradiation causes growth in rolling direction in products made of zircaloy sheet stock. No significant growth is experienced in the other direction. Tests on a spacer design of the type referred to above, indicate the local loads due to large spring deflections at all rod support locations increase the spacer envelope somewhat. Conversely, the restraint of the envelope to a small extent would deflect the spacer springs, increasing the load on the rods. The preferred orientation of the rolling direction is therefore perpendicular to the strip length for peripheral strips, thereby restrain in the overall envelope, and parallel to the length of the internal strips. Restraining the length of the internal strips would cause the spring heights to increase, which would tend to counterbalance the effect of irradiation induced relaxation of the springs.

The same thing can be accomplished by using fully recrystallized annealed zircaloy in the perimeter strip and cold worked, stress relieved internal (lattice) strips.

Cold rolled, stress relieved zircaloy grows much more due to irradiation than does the recrystallized annealed material.

DETAILED DESCRIPTION

Figure 1A:
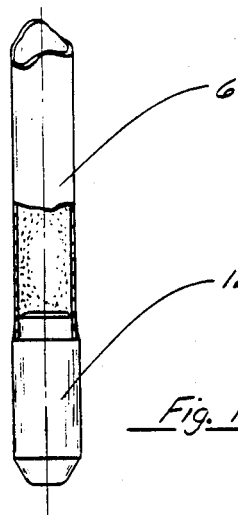
FIG. 1a is a view partially in elevation and partially in section of a fuel rod.
Figure 1:
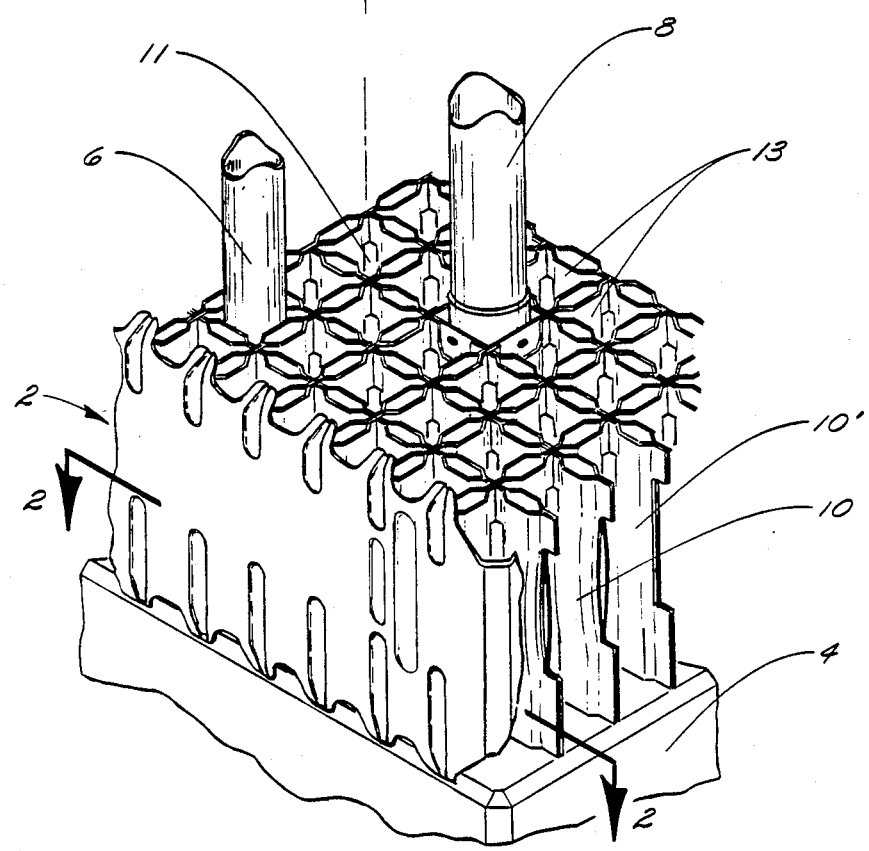
FIG. 1 is a partial perspective view of the lowermost grid spacer and the lower tie plate of the assembly in accordance with this invention.
Figure 3:
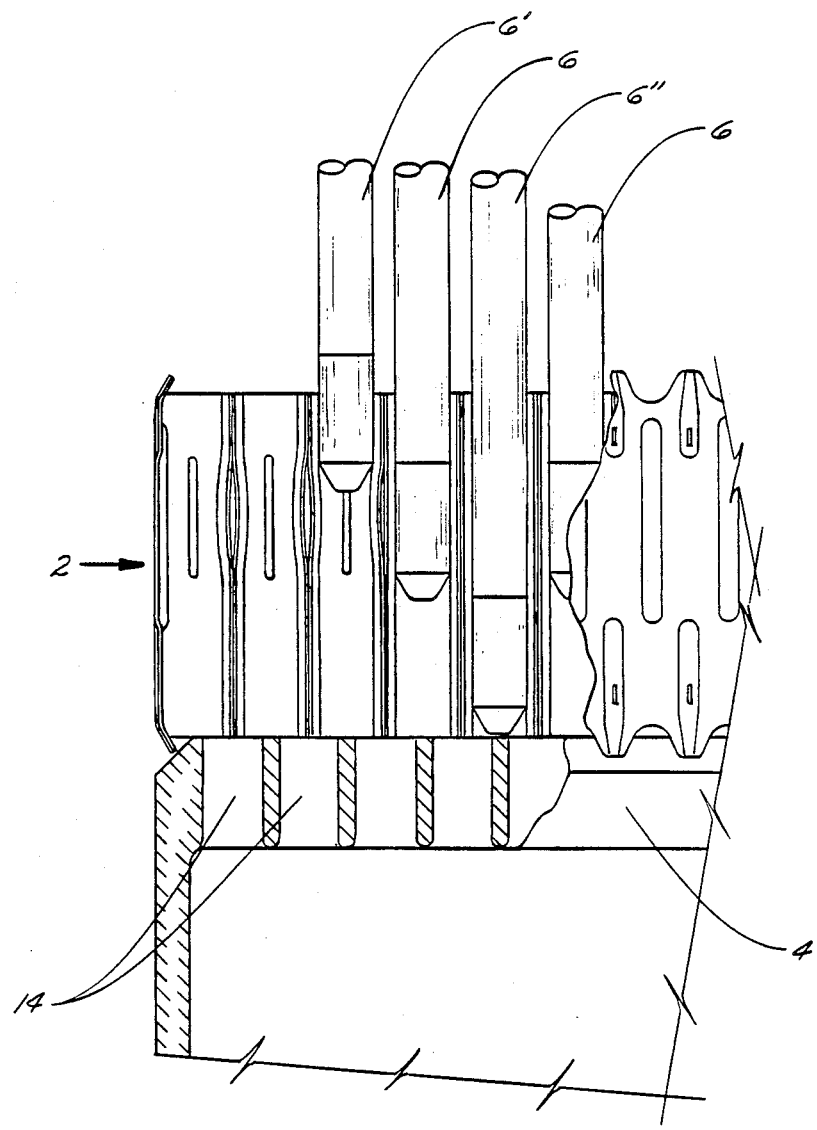
FIG. 3 is a partial section of the lowermost grid spacer and the lower tie plate.

The general type of fuel assembly with which this invention is concerned, is illustrated in FIG. 1 of U.S. application Ser. No. 936,448 entitled "Grid Spacer and Method of Same", filed Dec. 1, 1986, by Peter P. King, et al, now U.S. Pat. No. 4,756,878. As illustrated in that figure, the fuel assemblies are made up of a large number of vertical, closely positioned fuel rods which are held in place by grid spacers. The lowermost of these grid spacers is ordinarily positioned several inches above the lower tie plate. The rods extend through the grid spacer, and terminate close to the tie plate. In accordance with this invention, the lowermost grid spacer is positioned in contact, or substantially so, with the lower tie plate. This is illustrated in FIG. 1, wherein the lowermost grid spacer 2 is shown resting on lower tie plate 4. One of the fuel rods is illustrated at 6, extending part way through the grid spacer, as best shown in FIG. 3. A plurality of guide tubes 8 extend completely through the grid spacer and are secured to the tie plate 4. They are similarly secured to an upper tie plate (not shown) and act as tie rods to bind the assembly together.

The grid spacer is preferably of the general type shown in U.S. patent application Ser. No. 16,432, filed Feb. 19, 1987, by John F. Patterson, et al, now U.S. Pat. No. 4,726,926 granted 2/23/88. Similarly to the construction shown in that patent, the grid spacer 2 is formed of double rolled strips 13, which are deformed to provide channels 10. As shown, these channels are initially bowed outwardly, so that they engage the fuel rods and act as springs to hold the rods in position. When the rods are inserted they are flattened to the position shown at 10. In contrast to the disclosure of the last named patent, however, these channels need not be curved to deflect the cooling water, but may be vertical. Between the channels 10, there are openings 11 in the lattice strips. These serve two purposes: They add flexibility to the structure, and also provide passages for the lateral flow of cooling water between channels. If one channel is blocked by debris, the water can flow into it from other channels, and thereby prevent overheating of the fuel rods. These grid spacers are made deeper than normal in order to provide for changes in position of the lower ends of the fuel rods with irradiation growth due to exposure.

FIG. 3 shows a rod at three points, at 6 it is shown in what may be called the "normal" position of the fuel rod, 6' shows the maximum upward travel whlie 6" shows the maximum downward travel. In order to secure optimum behavior, the rods are modified from the usual form as shown in FIG. 1a where the rod 6 is provided with a somewhat elongated end cap 12, which is of the same outer diameter as the fuel rod. The use of an extended rod end cap having a diameter equal to or greater than the maximum cladding diameter and the higher-than-normal grid spacer with the bowed portions 10 contacting the fuel rods over a considerable distance, eliminates the possibility of rod support gaps forming due to irradiation induced cladding creepdown. This facilitates the support of the rod above the tie plate, and the solid end provides a greater distance between the fueled portion of the rod and the trapped debris.

Figure 2:
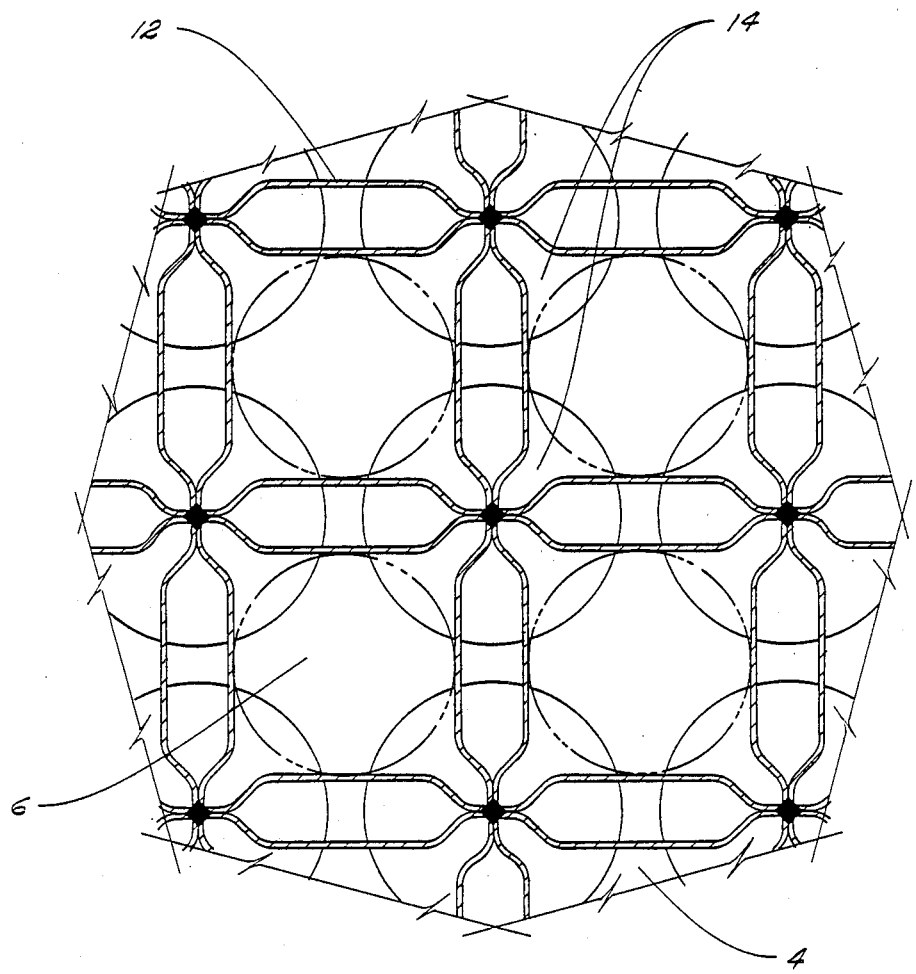
FIG. 2 is a partial section on the line 2—2 of FIG. 1 showing the relationship of the lowermost grid spacer and the tie plate and illustrating the flow paths formed by them.

FIG. 2 shows the relationship of the fuel rods 6, the lattice strips 13 of grid spacer 2, and holes 14 of tie plate 4 (the fuel rods are shown in phantom lines for greater clarity in illustrating the relationship). It will be seen that the lattice strips 13 divide the holes 14 of the tie plate into smaller passages and that the double strip construction of members 13 is particularly effective in this regard. It will be noted that the intersections of the grid strips are centered on the openings 14, that the channels 10 are adjacent to the intersections, and that because of the presence of those channels, each opening 14 is divided into eight sections, which are sufficiently small to prevent waste sufficiently large to be a problem from passing the tie plate 4 and entering the grid spacer. As will be seen by comparing this figure and FIG. 3, the holes 14 and the strips 13 form a trap for debris and keep it from reaching the fueled portions of fuel rods 6.

As has been explained above, the lattice strips 13 and the perimeter strip 16 of the grid spacer 2 are so cut from the zircaloy sheet stock from which they are made that the rolling direction of the stock is parallel to the width of the perimeter strip, i.e., vertically in FIG. 1, and longitudinally of the lattice strips, i.e., horizontally in FIG. 1. Alternatively, the perimeter strip 16 may be made of recrystallized annealed zircaloy and lattice strips 13 of cold worked, stress relieved zircaloy. As has been explained, this results in restraining the length of the lattice strips so as to cause the spring heights to increase with irradiation, and counterbalance the effect of irradiation-induced relaxation of those springs.

We claim as our invention:

1. In a fuel assembly comprising an upper tie plate and a lower tie plate, a plurality of fuel rods extending therebetween and a plurality of tie tubes extending therebetween and secured to said upper and lower tie plates, a plurality of grid spacers positioned between said tie plates and comprising intersecting strips forming cells through which said fuel rods and said tie tubes extend, said tie plates comprising relatively large, substantially circular openings through which water flows into said assembly; the improvement comprising: a grid spacer positioned substantially on said lower tie plate and positioned with the intersections of said strips approximately centered on said openings so as to subdivide said openings to trap debris and prevent it from entering spaces between said fuel rods, said last named grid spacer being formed of double strips, said double strips being deformed adjacent the intersections of said strips to form channels for cooling water, whereby the walls of said channels subdivide said openings.

2. An assembly as defined in claim 1, wherein the walls of said channels are bowed outwardly intermediate their height, to provide springs which contact said fuel rods.

3. An assembly as defined in claim 1 wherein each of said fuel rods has at its lower end, an end cap projecting from the fueled portion of said fuel rod by a distance of the general order of half the height of said grid spacer which is in contact with said lower tie plate, and having a diameter at least as large as the cladding of the fueled portion of said fuel rod.

4. An assembly as defined in claim 3, wherein said grid spacer in contact with said lower tie plate has a height greater than the other grid spacers.

5. An assembly as defined in claim 2, wherein the grid spacer substantially in contact with said lower tie plate is made substantially entirely of zircaloy, and the perimeter strip and transverse strips are formed from zircaloy sheet stock in such a manner that the rolling direction of the sheet stock is in the narrow direction of the perimeter strip, and in the longitudinal direction of said transverse strips.

6. An assembly as defined in claim 2, wherein the grid spacer substantially in contact with said lower tie plate is made substantially entirely of zircaloy, the perimeter strip thereof being of recrystallized annealed material and intersecting strips being of cold-worked, stress-relieved material.

7. A grid spacer for a nuclear reactor comprising a perimeter strip forming a polygon and a plurality of intersecting grid strips abutting said perimeter strip and extending across said polygon so as to form a plurality of cells for the reception of fuel rods, said grid strips being deformed to form channels extending perpendicular to the lengths of said grid strips, said channels being bowed outwardly intermediate their lengths to form springs for retaining said fuel rods, said grid strips and said perimeter strip being formed of material so selected that said grid strips have a greater elongation under nuclear irradiation than said perimeter strip.

8. A grid spacer as defined in claim 7, wherein said grid spacer is made substantially entirely of zircaloy.

9. A grid spacer as defined in claim 8, wherein said perimeter strip and said grid strips are formed from sheet stock in such a manner that the rolling direction of the sheet stock is in the narrow direction of the perimeter strip and in the longitudinal direction of said grid strips.

10. A grid spacer as defined in claim 8, wherein said perimeter strip is formed of recrystallized annealed material and said intersecting strips are formed of cold-worked, stress relieved material.

* * * * *